April 5, 1938.     M. J. SCHNEIDER     2,113,386
CHEESE RACK
Filed Dec. 30, 1936     2 Sheets-Sheet 1
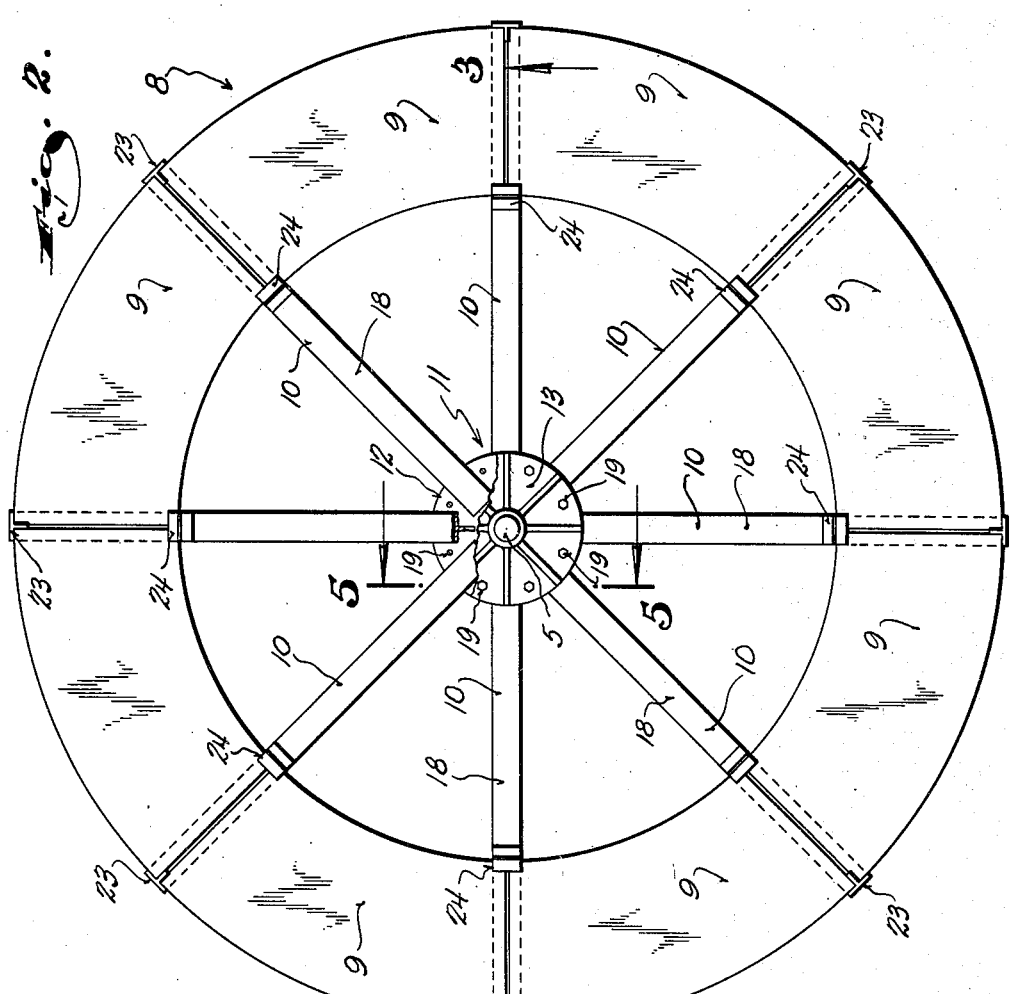
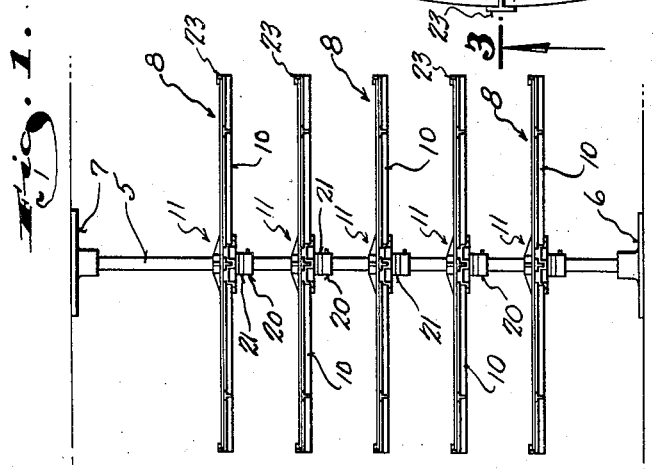
Inventor
Martin J. Schneider April 5, 1938. M. J. SCHNEIDER 2,113,386
CHEESE RACK
Filed Dec. 30, 1936 2 Sheets-Sheet 2
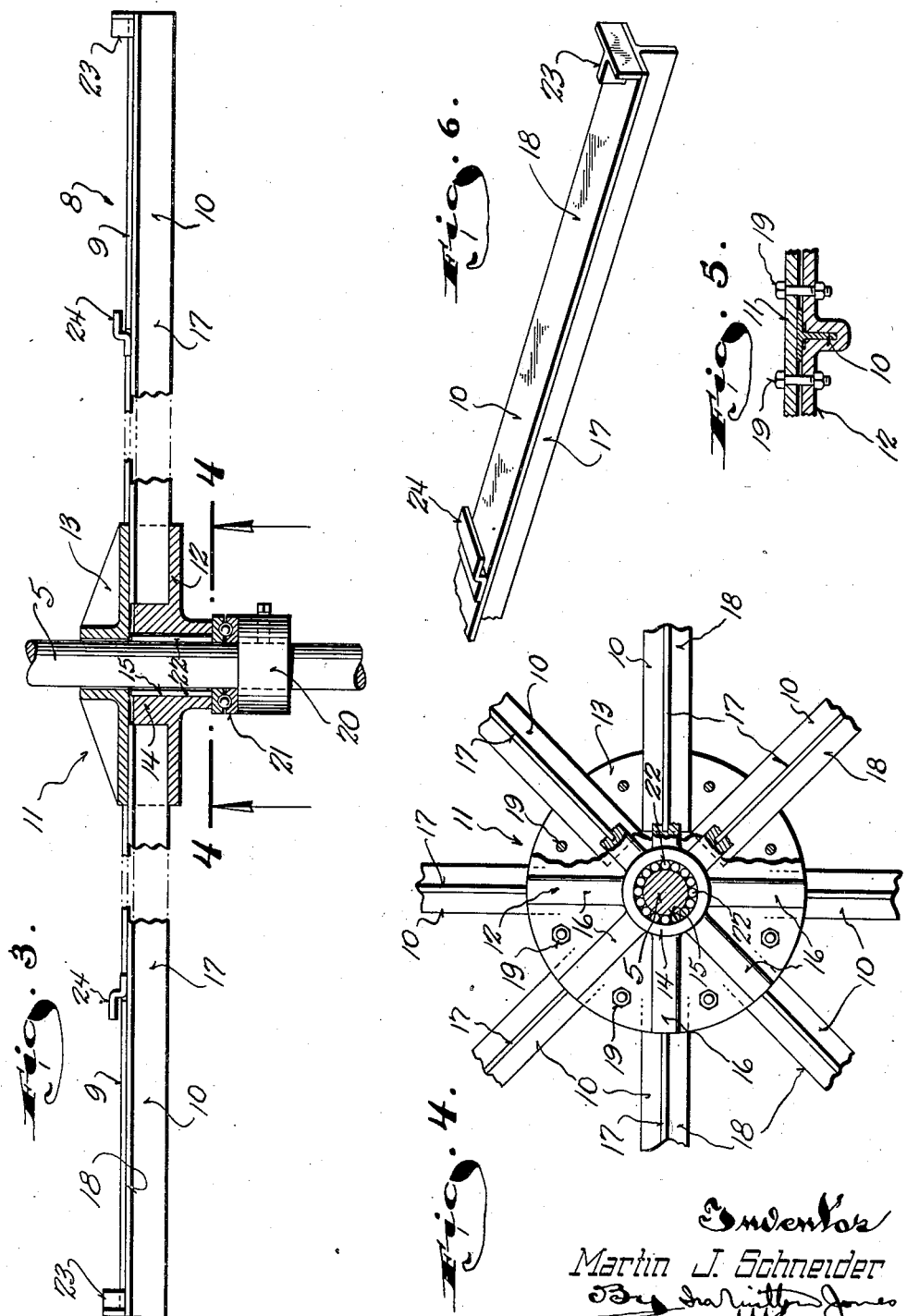

Patented Apr. 5, 1938

2,113,386

UNITED STATES PATENT OFFICE 2,113,386

CHEESE RACK

Martin J. Schneider, Linden, Wis.

Application December 30, 1936, Serial No. 118,219

2 Claims. (Cl. 211—144)

This invention relates to improvements in racks for supporting cheese and is a continuation as to all common subject matter of my application, Serial No. 38,813, filed August 31st, 1935.

After the cheese has been pressed to shape, it is allowed to dry for a period of time under suitable temperature conditions. Inasmuch as the space is generally at a premium in cheese factories, proper facilities for storing the cheese during this period has always been a problem.

It is therefore an object of this invention to provide a rack which is rotatable and so designed as to utilize to the best of advantage the small space available, and at the same time have its entire contents readily accessible.

It is also an essential requirement in an apparatus of this type, that the shelves upon which the cheese is placed be easily and thoroughly cleaned, and to this end, it is another object of this invention to provide a construction wherein the shelves are readily removable.

Another object of this invention is to provide a rack having a plurality of superimposed shelves rotatable about a fixed vertical support and so mounted as to be independently rotatable and adjustable as to height.

In this connection, it is a further object of this invention to provide an improved manner of mounting each individual shelf on the vertical support so as to insure utmost freedom of rotation for the shelves.

A further object of this invention is to provide a rack of the character described which lends itself well to economical manufacture, and which is entirely self-supporting and rigid so as to obviate braces and other auxiliary supports.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

Figure 1 is a side view of a complete rack constructed in accordance with this invention;

Figure 2 is a horizontal section view taken on the plane of the line 2—2 of Figure 1;

Figure 3 is a vertical section view taken through Figure 2 on the plane of the line 3—3;

Figure 4 is a section view through Figure 3 on the plane of the line 4—4;

Figure 5 is a detail section view taken on the plane of the line 5—5 of Figure 2; and Figure 6 is a perspective view illustrating the outer end portion of one of the supporting arms.

Referring now particularly to the accompanying drawings in which like numerals indicate like parts throughout the several views, the numeral 5 designates a vertical shaft anchored to the floor and ceiling as at 6 and 7, respectively. Freely rotatably mounted on this shaft in spaced superimposed relation are shelves 8. The spacing between the shelves is adjustable and each shelf is designed to hold approximately six thousand pounds of cheese.

The shelves proper upon which the cheese is placed are circular and consist of a plurality of end to end segments 9 removably supported on radial arms 10. The arms 10 are T-shaped in cross section, preferably being formed of T-irons, and are rigidly fixed to hubs 11.

Each hub 11 consists of a lower casting 12 and an upper casting 13. The lower casting has a central hub portion 14 bored as at 15 to a diameter greater than that of the vertical supporting shaft 5.

Radiating outwardly from this central hub portion 14 are sockets 16 open at their outer ends and at their top to receive the webs 17 of the T-shaped arms. The flanges 18 of the arms are clamped between the top face of the lower casting and the undersurface of the upper casting upon tightening of the bolts 19 by which the upper and lower hub castings are secured together.

The hub rests on a collar 20 which may be secured to the vertical shaft 5 at any desired elevation either by set screws or by being pinned thereto.

Between the top of the collar 20 and the bottom of the hub is a thrust bearing 21, and the bore 15 contains roller bearings 22 which coact with the thrust bearing 21 to freely rotatably mount the hub on the vertical supporting shaft. The bore in the upper hub casting through which the shaft 5 projects, while large enough to provide a running clearance is smaller than the bore in the lower casting so that the roller bearings are held thereby against upward displacement. Hence, it will be seen that with this construction of the hub even though the shelf is loaded to capacity, it may be freely turned to permit ready access to all parts thereof.

As stated, the shelf segments 9 are readily removably supported on the outer ends of the arms 10, and to hold the same against accidental displacement, the outer extremity of each arm has a section of T-iron 23 welded thereto with its web disposed vertically in line with the axis of the arm, and at a distance inwardly from the outer end of the arm corresponding to the width of the shelf, the arm has an overhanging strap 24 welded thereto.

The shelf segments are placed in position with their inner corners engaging under the straps 24 and their outer corners engaging the T-irons 23. With this construction, each segment is readily removable to facilitate cleaning thereof, and at the same time it is rigidly held against displacement and particularly against being tipped upwardly at its inner edge by a downward force exerted at the center of its outer periphery as in loading or unloading the cheese.

From the foregoing description taken in connection with the accompanying drawings, it will be readily apparent to those skilled in the pertinent art, that this invention provides a substantial improvement in rotatable cheese racks, especially as to its rigidity and ease of manipulation and use.

What I claim as my invention is:

1. In a cheese rack having a vertical supporting shaft and a circular shelf rotatable about the shaft: a hub for mounting the shelf on the shaft comprising a substantially disk-like lower section having a bore larger than the diameter of the shaft; roller bearings in the circular space between the shaft and the wall of said bore; a thrust bearing fixed to the shaft and on which the hub rests, said thrust bearing closing the bottom of the space in which the roller bearings are disposed; an upper substantially disk-like section superimposed upon the top of the lower section, said upper section having a bore to fit the shaft so that the upper section closes the top of the space in which the roller bearings are disposed; one of said sections having radial slots opening to its outer periphery and to its face adjacent to the other section to receive parts of the shelf; and means for securing the sections together to clamp said shelf parts therebetween.

2. In a cheese rack having a vertical supporting shaft and a circular shelf rotatable about the shaft: a hub for rotatably mounting the shelf on the shaft comprising a substantially disk-like lower section having a bore larger than the diameter of the shelf to provide an annular space between the wall of the bore and the shelf; roller bearings disposed in said annular space; a thrust bearing fixed to the shaft and on which the hub rests, said thrust bearing closing the bottom of the annular space; the lower section having radial slots T-shaped in cross section for the reception of parts of the shelf; an upper disk-like section bored to fit the shaft and superimposed upon the lower section to close the annular space and to engage the shelf parts disposed in said T-shaped radial slots; and means securing said sections together to clamp the shelf parts in said slots.

MARTIN J. SCHNEIDER.